United States Patent
Lim et al.

(10) Patent No.: US 11,206,424 B2
(45) Date of Patent: *Dec. 21, 2021

(54) METHOD AND APPARATUS FOR INTER PREDICTION USING MOTION VECTOR CANDIDATE BASED ON TEMPORAL MOTION PREDICTION

(71) Applicant: Electronics and Telecommunications Research Institute, Daejeon (KR)

(72) Inventors: Sung Chang Lim, Daejeon (KR); Hui Yong Kim, Daejeon-si (KR); Se Yoon Jeong, Daejeon-si (KR); Suk Hee Cho, Daejeon-si (KR); Jong Ho Kim, Daejeon-si (KR); Ha Hyun Lee, Seoul (KR); Jin Ho Lee, Daejeon-si (KR); Jin Soo Choi, Daejeon-si (KR); Jin Woong Kim, Daejeon-si (KR); Chie Teuk Ahn, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/887,370

(22) Filed: May 29, 2020

(65) Prior Publication Data
US 2020/0296412 A1 Sep. 17, 2020

Related U.S. Application Data

(63) Continuation of application No. 16/456,629, filed on Jun. 28, 2019, now Pat. No. 10,708,614, which is a
(Continued)

(30) Foreign Application Priority Data

Dec. 17, 2010 (KR) .......................... 10-2010-0130229
Dec. 19, 2011 (KR) .......................... 10-2011-0137042

(51) Int. Cl.
*H04N 19/52* (2014.01)

(52) U.S. Cl.
CPC .................................. *H04N 19/52* (2014.11)

(58) Field of Classification Search
None
See application file for complete search history.

(56) References Cited

U.S. PATENT DOCUMENTS 5,552,831 A 9/1996 Machida et al.
7,602,849 B2 10/2009 Booth et al.
(Continued)

FOREIGN PATENT DOCUMENTS

JP 5067905 B2 11/2012
JP 5970022 B2 8/2016
(Continued)

OTHER PUBLICATIONS

Bossen et al., "Simplified motion vector coding method," Joint Collaborative Team on Video Coding (JCT-VC) of ITU-T SGI 6 WP3 and ISO/IEC JTC1/SC29/WG11 2nd Meeting: Geneva, CH21-28, Jul. 2010, [JCTVC-B094]].*
(Continued)

*Primary Examiner* — Edemio Navas, Jr.
(74) *Attorney, Agent, or Firm* — NSIP Law

(57) ABSTRACT

An inter prediction method according to the present invention comprises: a step for deriving reference motion information related to a unit to be decoded in a current picture; and a step for performing motion compensation for the unit to be decoded, using the reference motion information that has been derived. According to the present invention, image encoding/decoding efficiency can be enhanced.

3 Claims, 7 Drawing Sheets

Related U.S. Application Data continuation of application No. 13/989,126, filed as application No. PCT/KR2011/009772 on Dec. 19, 2011, now Pat. No. 10,397,599.

(56) References Cited

U.S. PATENT DOCUMENTS

| | | | |
|---|---|---|---|
| 9,008,182 | B2 | 4/2015 | Tsai et al. |
| 2003/0025798 | A1 | 2/2003 | Grosvenor et al. |
| 2005/0276492 | A1 | 12/2005 | Kimura |
| 2008/0285651 | A1 | 11/2008 | Au et al. |
| 2010/0254450 | A1 | 1/2010 | Narroschke et al. |
| 2011/0080954 | A1* | 4/2011 | Bossen .............. H04N 19/52 375/240.16 |
| 2011/0194609 | A1 | 8/2011 | Rusert et al. |
| 2015/0229953 | A1* | 8/2015 | Oh .............. H04N 19/80 375/240.17 |

FOREIGN PATENT DOCUMENTS

| | | |
|---|---|---|
| JP | 6724198 B2 | 7/2020 |
| KR | 10-2004-0050653 A | 6/2004 |
| KR | 10-2006-0012440 A | 2/2006 |
| KR | 10-2008-0085815 A | 9/2008 |
| KR | 10-2008-0085818 A | 9/2008 |
| KR | 10-2010-0082017 | 7/2010 |
| KR | 10-2011-0083365 A | 7/2011 |
| WO | WO 2011/019247 A2 | 2/2011 |
| WO | WO 2011/048903 A1 | 4/2011 |
| WO | WO 2011/125211 A1 | 10/2011 |
| WO | WO 2013/036041 A2 | 3/2013 |

OTHER PUBLICATIONS

"Test Model under Consideration," $2^{nd}$ Meeting of Joint Collaborative Team on Video Coding (JCT-VC) of ITU-T SG16 WP3 and ISO/IEC JTC1/SC29/WG11 held in Geneva, Switzerland on Jul. 21-28, 2010, Document No. JCTVC-B205 (179 pages in English).

Bossen, Frank et al., "Simplified motion vector coding method," Joint Collaborative Team on Video Coding (JCT-VC) of ITU-T SGI 6 WP3 and ISO/IEC JTC1/SC29/WG11 $2^{nd}$ Meeting: Geneva , CH Jul. 21-28, 2010, [JCTVC-B094] (Year: 2010).

Chujoh, Takeshi, Akiyuki Tanizawa, and Tomoo Yamakage. "Description of Video Coding Technology Proposal by TOSHIBA." *Joint Collaborative Team on Video Coding, JCTVC-A117*, Dresden, Germany, Apr. 2010. (7 pages, in English).

Coding, Joint Collaborative Team-Video. "Test Model Under Consideration." *JCTVC-A205 output document*, Dresden, Germany Jul. 2010: 15-23. (23 pages in English).

Hellman, T. "Limiting Collocated Temporal Reference to One Per Picture." Joint Collabortive Team on Video Coding of ISO/IEC JTC1/SC29/WG11 and ITU-T SG 16. (4 pages in English).

International Search Report dated Jun. 29, 2012 in corresponding International Patent Application No. PCT/KR2011/009772 (3 pages, in Korean).

Japanese Office Action dated Mar. 14, 2014 in counterpart Japanese Application No. 2013-540905 (2 pages, in Japanese).

McCann et al. "Samsung's Response to the Call for Proposals on Video Compression Technology" [online], Joint Collaborative Team on Video Coding (JCT-VC)of ITU-T SG16 WP3 and ISO/IEC JTC1/SC29/WG11 JCTVC-A124, (Apr. 2010): (5 pages, in English).

Su, Yeping et al.. "On Motion Vector Competition." *JCTVC-C257 output document*, Guangzhou, China Oct. 2010. (3 pages in English).

* cited by examiner

METHOD AND APPARATUS FOR INTER PREDICTION USING MOTION VECTOR CANDIDATE BASED ON TEMPORAL MOTION PREDICTION

CROSS-REFERENCE TO RELATED APPLICATIONS

This application is a continuation of U.S. application Ser. No. 16/456,629, filed on Jun. 28, 2019, which is a continuation of U.S. application Ser. No. 13/989,126, having a 371(c) date of May 23, 2013, now U.S. Pat. No. 10,397,599, issued on Aug. 27, 2019, which is a U.S. national stage application of International Application No. PCT/KR2011/009772, filed on Dec. 19, 2011, which claims the benefit of Korean Patent Application No. 10-2011-0137042, filed on Dec. 19, 2011 and Korean Patent Application No. 10-2010-0130229, filed on Dec. 17, 2010 in the Korean Intellectual Property Office, the entire disclosures of which are incorporated herein by reference for all purposes.

TECHNICAL FIELD

The present invention relates to image processing, and more particularly, to an inter prediction method and apparatus.

BACKGROUND ART

Recently, with the expansion of broadcasting services having high definition (HD) resolution in the country and around the world, many users have been accustomed to a high resolution and definition image, such that many organizations have conducted many attempts to develop next-generation image devices. In addition, the interest in HDTV and ultra high definition (UHD) having a resolution four times higher than that of HDTV have increased and thus, a compression technology for higher-resolution and higher-definition image have been required.

For the image compression, an inter prediction technology predicting pixel values included in a current picture from a picture before and/or after the current picture, an intra prediction technology predicting pixel values included in a current picture using pixel information in the current picture, an entropy encoding technology allocating a short code to symbols having a high appearance frequency and a long code to symbols having a low appearance frequency, or the like, may be used.

DISCLOSURE

Technical Problem

The present invention provides an image encoding method and apparatus capable of improving image encoding/decoding efficiency.

The present invention also provides an image decoding method and apparatus capable of improving image encoding/decoding efficiency.

The present invention also provides an inter prediction method and apparatus capable of improving image encoding/decoding efficiency.

The present invention also provides temporal motion information encoding method and apparatus capable of improving image encoding/decoding efficiency.

The present invention also provides temporal motion information decoding method and apparatus capable of improving image encoding/decoding efficiency.

Technical Solution

In an aspect, there is provided an inter prediction method, including: deriving reference motion information on a decoding target unit within a current picture; and performing motion compensation on the decoding target unit by using the derived reference motion information, wherein the reference motion information is motion information included in a reference picture for the current picture and includes at least one of a reference picture list, a reference picture index, a motion vector, a prediction direction, and a motion vector predictor.

The deriving of the reference motion information may further include extracting the reference motion information from the reference picture.

The extracting of the reference motion information may further include: obtaining count information by counting occurrence frequency of each of the plurality of motion information within the reference picture; and selecting the reference motion information from the plurality of motion information within the reference picture, based on the obtained count information.

The extracting of the reference motion information may include: deriving a motion information median by performing median operation on the motion information within the reference picture; and extracting the motion information median as the reference motion information.

The extracting of the reference motion information may further include performing sub-sampling on the motion information within the reference picture.

The sub-sampling may further include: selecting a block of a predetermined position among a plurality of blocks having a second size included in a block having a first size within the reference picture; and extracting the motion information corresponding to the selected block as the reference motion information, wherein each motion information within the reference picture may be stored in the block unit having the second size.

The predetermined position may be a leftmost upper position within the block having the first size.

The extracting of the reference motion information may further include: grouping the motion information within the reference picture into a plurality of groups; and selecting a predetermined number of motion information as the reference motion information in each of the plurality of groups, based on the occurrence frequency of the motion information, wherein at the grouping, the grouping is performed based on at least one characteristic of a depth value of a unit included in the reference picture, a size of the unit included in the reference picture, and a partition type of the unit included in the reference picture.

The extracting of the reference motion information may further include: dividing the reference picture into a plurality of regions; and selecting the predetermined number of motion information as the reference motion information in each of the plurality of regions, based on the occurrence frequency of the motion information.

When the number of reference pictures is two or more, the extracting of the reference motion information may further include selecting the predetermined number of motion information in each of the reference pictures, based on the occurrence frequency of the motion information.

The extracting of the reference motion information may include: deriving a temporal distance from the current picture for each of the reference pictures; and scaling the selected motion information based on the derived temporal distance.

The performing of the motion compensation may include: receiving and decoding a motion information difference; deriving a predicted motion vector on the decoding target unit; deriving a motion vector on the decoding target unit by using the decoded motion vector difference and the derived predicted motion vector; and performing the motion compensation on the decoding target unit by using the derived motion vector.

The deriving of the predicted motion vector may include: generating a motion vector candidate for the decoding target unit by using the reference motion information; and deriving the predicted motion vector by using the motion vector candidate.

The performing of the motion compensation may include: receiving a merge index and decoding the received merge index; generating a merge candidate list by using the reference motion information; selecting a motion information indicated by the merge index among the merge candidates included in the merge candidate list; and performing the motion compensation for the decoding target unit by using the selected motion information.

When the number of reference motion information is two or more, the performing of the motion compensation may include: receiving and decoding the encoded motion information index; selecting the motion information indicated by the motion information index among the reference motion information; and performing the motion compensation on the decoding target unit by using the selected motion information.

The deriving of the reference motion information may further include: receiving the encoded reference motion information; and decoding the received reference motion information.

When the number of encoded reference motion information is two or more, the decoding may decode the received reference motion information by using differential pulse code modulation.

Advantageous Effects

The image encoding method according to the exemplary embodiments of the present invention can improve the image encoding/decoding efficiency.

Further, the image decoding method according to the exemplary embodiments of the present invention can improve the image encoding/decoding efficiency.

The inter prediction method according to the exemplary embodiments of the present invention can improve the image encoding/decoding efficiency.

Further, the temporal motion information encoding method according to the exemplary embodiments of the present invention can improve the image encoding/decoding efficiency.

Further, the temporal motion information decoding method according to the exemplary embodiments of the present invention can improve the image encoding/decoding efficiency.

MODE FOR INVENTION

Hereinafter, exemplary embodiments of the present invention will be described in detail with reference to the accompanying drawings. In describing exemplary embodiments of the present invention, well-known functions or constructions will not be described in detail since they may unnecessarily obscure the understanding of the present invention.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Further, in the present invention, "comprising" a specific configuration will be understood that additional configuration may also be included in the embodiments or the scope of the technical idea of the present invention.

Terms used in the specification, 'first', 'second', etc. can be used to describe various components, but the components are not to be construed as being limited to the terms. The terms are only used to differentiate one component from other components. For example, the 'first' component may be named the 'second' component without being departed from the scope of the present invention and the 'second' component may also be similarly named the 'first' component.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be joined to form one constitutional part or one constitutional part may be divided into a plurality of constitutional parts to perform each function. The embodiment where each constitutional part is joined and the embodiment where one constitutional part is divided are also included in the scope of the present invention, if not departing from the essence of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Figure 1:
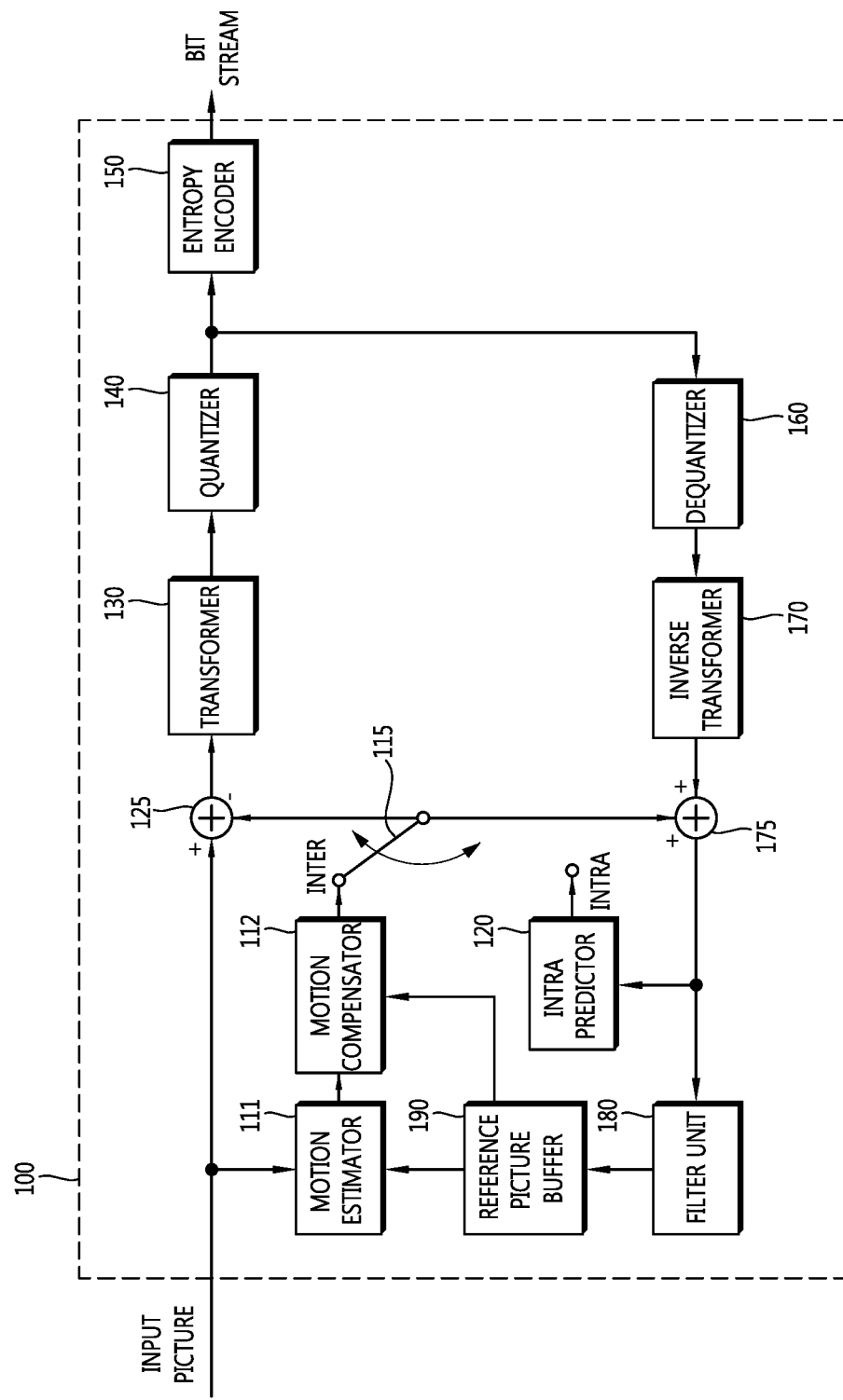
FIG. 1 is a block diagram showing a configuration of an image encoding apparatus according to an exemplary embodiment of the present invention.

FIG. 1 is a block diagram showing a configuration of an image encoding apparatus according to an exemplary embodiment of the present invention.

Referring to FIG. 1, an image encoding apparatus 100 includes a motion estimator 111, a motion compensator 112, an intra predictor 120, a switch 115, a subtractor 125, a transformer 130, a quantizer 140, an entropy encoder 150, a dequantizer 160, an inverse transformer 170, an adder 175, a filter unit 180, and a reference picture buffer 190.

The image encoding apparatus 100 may perform encoding on input images with an intra mode or an inter mode to output bit streams. The intra prediction means intra-picture prediction and the inter prediction means inter-picture prediction. In the case of the intra mode, the switch 115 may be switched to intra and in the case of the inter mode, the switch 115 may be switched to inter. The image encoding apparatus 100 may generate a prediction block for an input block of the input images and then, encode residuals between the input block and the prediction block.

In the case of the intra mode, the intra predictor 120 may perform spatial prediction using the pixel values of the previously encoded blocks around the current block to generate the prediction block.

In the inter mode, the motion estimator 111 may search a region optimally matched with the input block in the reference picture stored in the reference picture buffer 190 during the motion prediction process to obtain a motion vector. The motion compensator 112 may perform the motion compensation by using the motion vector to generate the prediction block. Here, the motion vector is a two-dimensional vector used for inter prediction and may represent offset between a currently encoded/decoded picture and a reference picture.

The subtractor 125 may generate a residual block due to the residuals of the input block and the generated prediction block. The transformer 130 may output transform coefficients by performing a transform on the residual block. Further, the quantizer 140 may quantize the input transform coefficient according to quantization parameters to output quantized coefficients.

The entropy encoder 150 may perform entropy encoding based on values calculated in the quantizer 140 or encoding parameter values, or the like, calculated during the encoding process to output bit streams.

When the entropy encoding is applied, the entropy encoding may represent symbols by allocating a small number of bits to the symbols having high occurrence probability and allocating a large number of bits to the symbols having low occurrence probability, thereby reducing a size of the bit streams for encoding target symbols. Therefore, the compression performance of the video encoding may be increased through the entropy encoding. For the entropy encoding 150, an encoding method such as exponential golomb, context-adaptive variable length coding (CAVLC), context-adaptive binary arithmetic coding (CABAC), or the like, may be used.

The image encoding apparatus according to the exemplary embodiment of FIG. 1 performs the inter prediction encoding, that is, the inter-picture prediction encoding and thus, the current encoded image needs to be decoded and stored so as to be used as the reference picture. Therefore, the quantized coefficient may be dequantized in the dequantizer 160 and inversely transformed in the inverse transformer 160. The dequantized, inverse transformed coefficients are added to the prediction block through the adder 175 to generate a reconstructed block.

The reconstructed block passes through the filter unit 180 and the filter unit 180 may apply at least one of a deblocking filter, sample adaptive offset (SAO), and an adaptive loop filter to the reconstructed block or a reconstructed picture. The filter unit 180 may also be referred to as an adaptive in-loop filter. The deblocking filter may remove a block distortion generated at a boundary between the blocks. The SAO may add a proper offset value to the pixel values so as to compensate for coding error. The ALF may perform the filtering based on values obtained by comparing the reconstructed image with the original image. The reconstructed block passing through the filter unit 180 may be stored in the reference picture buffer 190.

Figure 2:
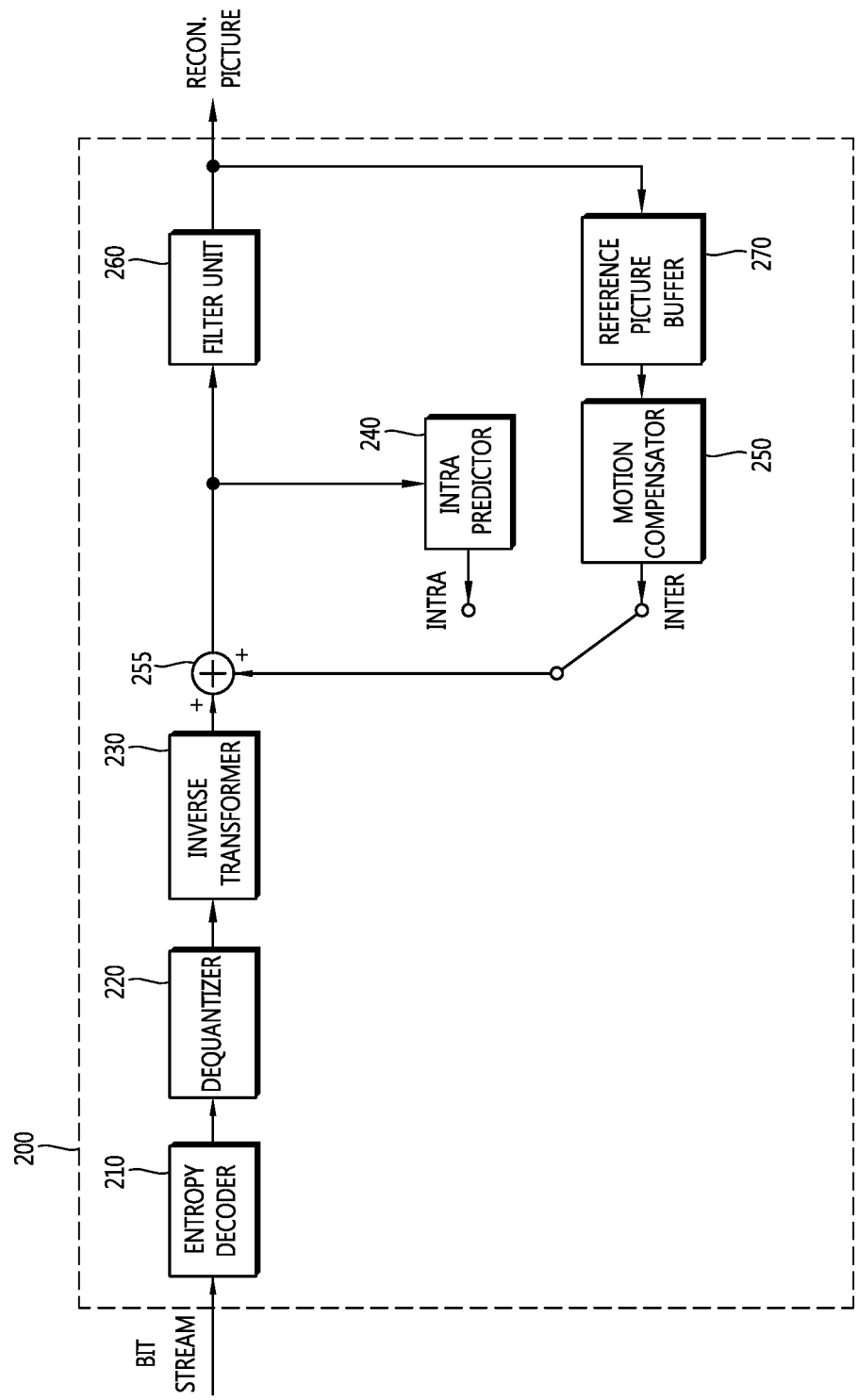
FIG. 2 is a block diagram showing a configuration of an image decoding apparatus to according to an exemplary embodiment of the present invention.

FIG. 2 is a block diagram showing a configuration of an image decoding apparatus to according to an exemplary embodiment of the present invention.

Referring to FIG. 2, an image decoding apparatus 200 includes an entropy decoder 210, a dequantizer 220, an inverse transformer 230, an intra predictor 240, a motion compensator 250, an adder 255, a filter unit 260, and a reference picture buffer 270.

The image decoding apparatus 200 may receive the bit streams output from the encoder to perform the decoding with the intra mode or the inter mode and output the reconstructed image, that is, the reconstructed image. In the case of the intra mode, the switch may be switched to the intra and in the case of the inter mode, the switch may be switched to the inter mode. The image decoding apparatus 200 obtains the residual block from the received bit streams and generates the prediction block and then, add the residual block and the prediction block, thereby generating the reconstructed block, that is, the reconstructed block.

The entropy decoder 210 may perform the entropy encoding on the input bit streams according to the probability distribution to generate the symbols having the quantized coefficient type of symbols. The entropy decoding method is similar to the above-mentioned entropy encoding method.

When the entropy decoding method is applied, a small number of bits are allocated to the symbols having high occurrence probability and a large number of bits are allocated to the symbols having low occurrence probability to represent the symbols, thereby reducing a size of the bit streams for each symbol. Therefore, the compression performance of the image decoding may also be increased through the entropy decoding method.

The quantized coefficients are dequantized in the dequantizer 220 and are inversely transformed in the inverse transformer 230. The quantized coefficients may be dequantized/inversely transformed to generate the residual block.

In the case of the intra mode, the intra predictor 240 may perform spatial prediction using the pixel values of the previously encoded blocks around the current block to generate the prediction block. In the case of the inter mode, the motion compensator 250 performs the motion compensation by using the motion vector and the reference picture stored in the reference picture buffer 270, thereby generating the prediction block.

The residual block and the prediction block are added through the adder 255 and the added block passes through the filter unit 260. The filter unit 260 may apply at least one of the deblocking filter, the SAO, and the ALF to the reconstructed block or the reconstructed picture. The filter unit 260 outputs the reconstructed images, that is, the reconstructed images. The reconstructed image may be stored in the reference picture buffer 270 so as to be used for the inter prediction.

Hereinafter, the unit means a unit of the image encoding and decoding. At the time of the image encoding and decoding, the coding or decoder means the divided unit when performing the encoding and decoding by dividing the images, which may be called a coding unit (CU), a coding block, a prediction unit (PU), a transform unit (TU), a transform block, or the like. The single unit may be subdivided into a lower block having a smaller size.

Here, the prediction unit means a basic unit that is a unit performing the prediction and/or the motion compensation. The prediction unit may be divided into a plurality of partitions and each partition may also be referred to as prediction unit partition. When the prediction unit is divided into a plurality of partitions, each of the plurality of partitions may be referred to as a basic unit that is a unit of performing the prediction and/or the motion compensation. Hereinafter, in the exemplary embodiment of the present invention, each partition in which the prediction unit is divided may also be referred to as the prediction unit.

Meanwhile, as described above, an encoder and a decoder may perform the inter prediction and/or the motion compensation on the encoding/decoding target unit in the inter mode. In this case, the encoding/decoding target unit may mean the prediction unit and/or the prediction unit partition. In this case, the encoder and decoder can improve the encoding/decoding efficiency by using the motion vector of a reconstructed neighbor unit and/or a collocated unit. In this case, the reconstructed neighbor unit, which is a neighbor unit that is adjacent to the encoding/decoding target unit or is disposed at a corner of the encoding/decoding target unit, may mean a unit that is encoded or decoded in advance and reconstructed. In addition, the collocated unit may mean a unit that exists at the spatially same position as the encoding/decoding target unit within the reconstructed reference picture. Hereinafter, the motion vector included in the reference picture is referred to as a temporal motion vector. For example, the motion vector of the collocated unit may be referred to as the temporal motion vector.

For example, the encoder and decoder may use the motion vector and/or temporal motion vector of the reconstructed neighbor unit as the motion vector of the encoding/decoding target unit. In this case, the encoding/decoding target unit uses the motion vector and the temporal motion vector of the reconstructed neighbor unit and thus, the encoder may not encode the motion vector for the encoding/decoding target unit. Therefore, the bit amount transmitted to the decoder may be reduced and the encoding efficiency may be improved. An example of the inter prediction mode may include a skip mode and/or a direct mode, or the like.

In this case, the encoder may use an identifier and/or an index indicating whether the motion vector of any unit of the reconstructed neighbor units is used. The inter prediction mode that uses the identifier and/or index may be referred to as a merge mode.

As another example, the encoder and the decoder may use the motion vector of the encoding/decoding target unit to perform prediction and/or compensation and then, may use the predicted motion vector for the encoding/decoding target unit when encoding the motion vector of the encoding/decoding target unit. Here, the predicted motion vector may be the motion vector or the temporal motion vector of the reconstructed neighbor unit. That is, the encoder and decoder may use the motion vector or the temporal motion vector of the reconstructed neighbor unit as the predicted motion vector to efficiently encode the motion vector of the encoding/decoding target unit.

The encoder may generate a motion vector difference by the residuals between the motion vector and the predicted motion vector of the encoding target unit. Here, the motion vector difference may mean the difference value between the motion vector and the predicted motion vector of the encoding target unit. The encoder may encode the generated motion vector difference and transmit the encoded motion vector difference to the decoder. In this case, the decoder may decode the motion vector difference and may derive the motion vector of the decoding target unit through the sum of the decoded motion vector difference and the predicted motion vector. The inter prediction method may be referred to as motion vector prediction (MVP). The MVP is used such that the information amount transmitted from the encoder to the decoder may be reduced and the encoding efficiency may be improved.

In this case, the encoder may use an identifier and/or an index indicating whether the motion vector of any unit of the reconstructed neighbor units is used. The MVP that additionally uses the identifier and/or the index may be referred to as advanced motion vector prediction.

In the above-mentioned skip mode, direct mode, merge mode, MVP, AMVP, or the like, the motion information within the reference picture may be used for the prediction and/or the motion compensation of the current encoding/decoding target unit. The motion information within the reference picture used for the prediction and/or the motion compensation of the current encoding/decoding target unit may be referred to as the temporal motion information. An example of the temporal motion information may include the temporal motion vector, or the like.

Here, the motion information means the encoding parameter used for the inter prediction and the motion compensation. The encoding parameter may include information that is encoded in the encoder like a syntax element and transferred to the decoder and information that may be derived during the encoding or decoding process and means necessary information at the time of encoding and decoding images. The motion information may include at least one of a reference picture list, a reference picture index, a motion vector, a prediction direction, and a motion vector predictor.

Here, the reference picture list is a list configured as a plurality of reference pictures used for the inter prediction. Two reference picture lists may be used for the inter prediction. One thereof may be referred to as reference picture list 0 and the other one thereof may be referred to as reference picture list 1. In this case, the prediction direction included in the motion information may be information indicating whether any reference picture list is used at the time of the inter prediction. That is, the prediction direction may indicate whether the reference picture list 0 is used, whether the reference picture list 1 is used, or whether both of the reference picture list 0 and the reference picture list 1 are used.

The reference picture index is an index indicating the reference picture used for the inter prediction of the encoding/decoding target unit among the reference pictures included in the reference picture list. Further, the motion vector predictor may mean the unit that is prediction candidates and/or the motion vector of the unit that is prediction candidates, when the encoder and the decoder predict the motion vector.

The above-mentioned encoding parameter may include the motion information, the inter prediction mode, a coded block pattern (CBP), a block size, values and/or statistics such as a block division information, or the like. In this case, the block division information may include information on a depth of the unit. The depth information may indicate a frequency and/or a degree that divides the unit.

Figure 3:
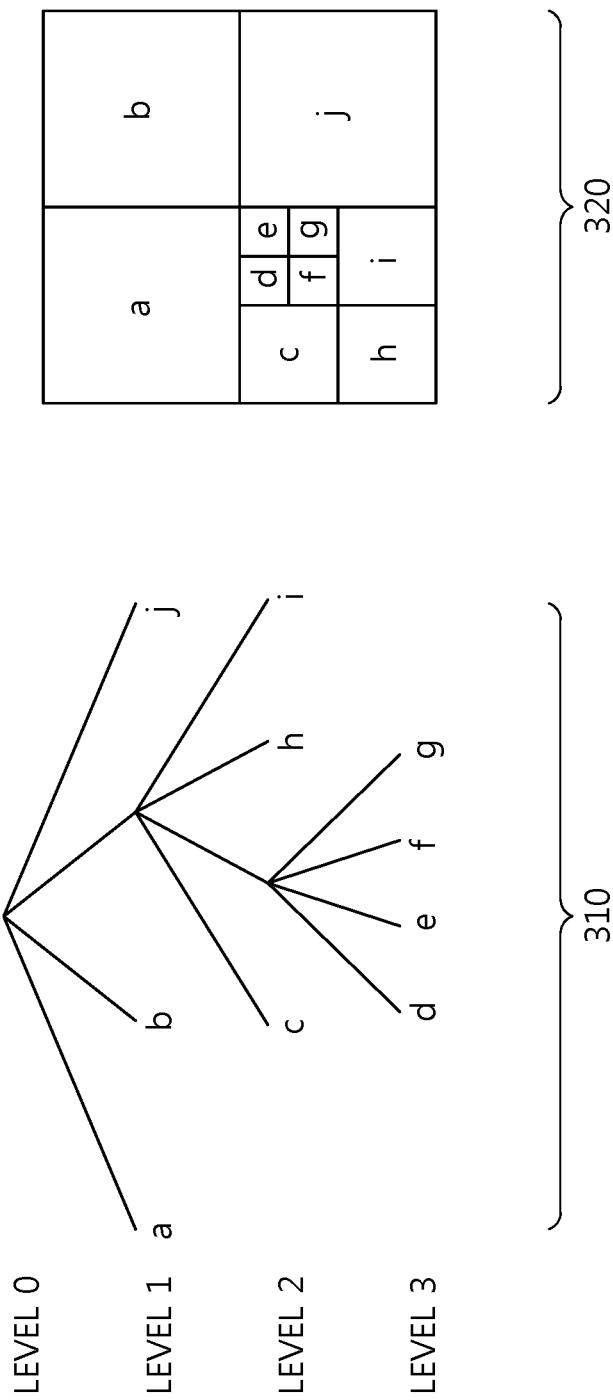
FIG. 3 is a conceptual diagram schematically showing an exemplary embodiment in which a single unit is divided into a plurality of sub units.

FIG. 3 is a conceptual diagram schematically showing an exemplary embodiment in which a single unit is divided into a plurality of sub units.

A single unit may have depth information and may be hierarchically divided, based on a tree structure. Each divided subunit may have the depth information. The depth information indicates the frequency and/or the degree in which the unit is divided and therefore, may also include the information on the size of the subunit.

Referring to reference numeral 310 of FIG. 3, the highest node may be referred to as a root node and may have the smallest depth value. In this case, the highest node may have a depth of level 0 and may indicate the first unit that is not divided.

The lower node having a depth of level 1 may indicate a unit in which the first unit is divided once and the lower node having a depth of level 2 may indicate a unit in which the first unit is divided twice. For example, in reference numeral 320 of FIG. 3, unit a corresponding to node a is a unit which is divided once in the first unit and may have the depth of level 1.

A leaf node of level 3 may indicate a unit in which the first unit is divided three times. For example, in reference numeral 320 of FIG. 3, unit d corresponding to node d is a unit which is divided three times in the first unit and may have the depth of level 3. Therefore, the leaf node of level 3 that is the lowest node may have the deepest depth.

As described above, the encoder and the decoder may use the temporal motion information (for example, the temporal motion vector) when the inter prediction and/or the motion compensation are performed using the skip mode, the direct mode, the merge mode, the MVP, the AMVP, or the like. However, the inter prediction method using the temporal motion information has a disadvantage in that the reference picture fore the encoding/decoding target picture needs to be stored in a memory. In addition, when the reference picture is lost, the motion information (for example, the temporal motion vector) within the reference picture may not be used as it is and therefore, the errors may be propagated according to the progress of the encoding/decoding process. Therefore, the inter prediction method using the temporal motion information may have a disadvantage in terms of error resiliency. Therefore, a need exists for the inter prediction method capable of efficiently encoding/decoding motion information within the reference picture and improving the error resiliency.

Figure 4:
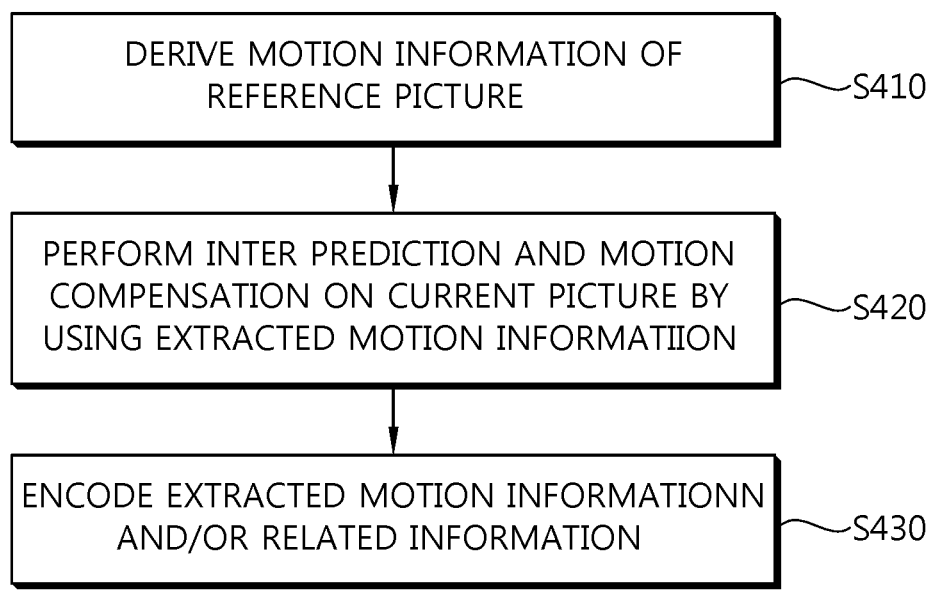
FIG. 4 is a flow chart schematically showing a method for deriving an inter prediction method in an encoder according to an exemplary embodiment of the present invention.

FIG. 4 is a flow chart schematically showing a method for deriving an inter prediction method in an encoder according to an exemplary embodiment of the present invention.

Referring to FIG. 4, the encoder may extract the motion information on the reference picture for the current picture (S410). In this case, the encoder may extract N motion information among the motion information included in the reference picture. The extracted motion information may be used for the inter prediction and/or the motion compensation of the encoding target unit within the current picture. Here, N indicates a positive integer and in the exemplary embodiments as described below, N means the positive integer.

Hereinafter, the exemplary embodiments of the method for extracting the motion information of the reference picture will be described. The encoder may extract the motion information on the reference picture by using at least one of the methods for extracting motion information to be described below.

According to an exemplary embodiment of the method for extracting motion information, the encoder may extract the motion information according to the motion information occurrence frequency within the reference picture. In this case, for example, the encoder may select and extract N motion information among the motion information within the reference picture in order of the occurrence frequency. The following Table 1 shows the method for extracting motion information according to the information occurrence.

TABLE 1

| Order of occurrence frequency | Motion vector | Count |
|---|---|---|
| 1 | [0, 0] | 2839 |
| 2 | [1, 0] | 569 |
| 3 | [0, −1] | 432 |
| 4 | [2, 0] | 258 |
| 5 | [1, 1] | 129 |
| 6 | [1, −1] | 54 |
| ... | ... | ... |

Referring to Table 1, the encoder counts the motion vector occurrence frequency within the reference picture during the encoding process to obtain the count information. In this case, the encoder may select the N motion vector in order of the occurrence frequency. In the exemplary embodiment of Table 1, when N is 3, the extracted motion vector may be [0,0], [1,0], and [0,−1].

As another example, the encoder may also obtain the count information on each component of the motion vector rather than on the motion vector during the encoding process. Here, the motion vector may be represented by [x, y] with a two-dimensional vector type and thus, each component may means x component and y component. In this case, the encoder may select N component in order of the occurrence frequency for each of the motion vector components. The encoder may extract the N motion vectors by using the selected motion vector components.

According to the exemplary embodiment of the present invention, the encoder may quantize the motion information of the reference picture and then, count the occurrence frequency of the quantized motion information to obtain the count information. For example, the encoder may quantize the motion vector in a ¼ pixel unit with the motion vector of an integer pixel unit during the encoding process and count the occurrence frequency of the quantized motion vector. In this case, the encoder may select and/or extract the N motion vectors in order of occurrence frequency among the quantized motion vectors.

In this case, the encoder may perform the quantization for the motion information according to a quantization step size. The information on the quantization step size may be identically stored in the encoder and the decoder. In this case, the decoder may know the quantization step size used in the encoder and thus, the encoder may not transmit the information on the quantization step size to the decoder. When the decoder does not have the information on the quantization step size, the encoder may encode the information on the quantization step size and transmit the encoded information to the encoder through bit stream. The decoder decodes the information on the transmitted quantization step size and may use the decoded information to quantize the motion information.

According to another exemplary embodiment of the method for extracting motion information, the encoder may perform a predetermined process on a plurality of motion information included in the reference picture to extract the temporal motion information.

For example, the encoder may perform a median operation on the plurality of motion information included in the reference picture to extract the temporal motion information. For example, it is assumed that three motion vectors [0,0], [−3,5], and [−4,2] are present within the reference picture. In this case, the encoder may perform the median operation on each component of the motion vector to extract one motion vector [−3, 2].

As another exemplary embodiment of the present invention, the encoder may perform the sub-sampling on the plurality of motion information included in the reference picture to extract the N motion information. For example, it is assumed that the motion vectors within the reference picture are arranged in a two-dimensional type as in the following Table 2.

TABLE 2

| | | | |
|---|---|---|---|
| [−2, 4] | [−1, 3] | [0, −1] | [2, 2] |
| [1, 1] | [0, 0] | [−1, 1] | [1, 1] |
| [5, −1] | [−3, 7] | [−2, 1] | [0, 0] |
| [1, 3] | [5, −4] | [1, 1] | [3, 3] |

Referring to FIG. 2, the encoder may extract the motion vector that is present in an odd numbered row and an odd numbered column in a motion vector arrangement in a two-dimensional type through the sub-sampling. In this case, four motion vectors such as [−2, 4], [0, −1], [5, −1], [−2, 1] may be extracted.

According to another exemplary embodiment of the present invention of the method for extracting N motion information by performing the sub-sampling on the plurality of motion information included in the reference picture, the encoder may extract the motion vector corresponding to the specific position in the motion vector arrangement in the two-dimensional type.

For example, when the motion vectors within the reference picture are arranged in the two-dimensional type as in Table 2, the encoder may extract the motion vector corresponding to the specific position in the two-dimensional motion vector arrangement.

For example, the motion vectors may be stored in the motion vector arrangement in the two-dimensional type in a 4×4 block unit. In this case, the encoder may select the block corresponding to the predetermined position among blocks having a 4×4 size included in a block having a 16×16 size and may extract the motion vector corresponding to the selected block. Here, the predetermined position may be the leftmost upper position within the block having 16×16 size. In the exemplary embodiment of Table 2, the predetermined position may be a position corresponding to the motion vector [−2, 4]. In this case, the encoder may extract the motion vector of [−2, 4].

According to another exemplary embodiment of the method for extracting motion information, the encoder may sort and/or group the motion information within the reference picture into a plurality of groups, based on characteristics of the unit included in the reference picture. The characteristics of the unit may be a depth of the unit, a size of the unit, and/or a partition type of the unit, or the like. In this case, the encoder may extract a total of N motion information by extracting M (hereinafter, M is a positive integer) motion information according to the occurrence frequency for each group.

For example, when the depth value of the units within the reference picture is present from 0 to P-1 (hereinafter, P is a positive integer), the encoder may sort the motion information within the reference picture into P group based on the depth value of the unit. In this case, the encoder may obtain the count information by counting the occurrence frequency of the motion vector for each group during the encoding process. That is, the encoder may obtain the count information of the motion vector for each depth of the unit. The encoder may extract a total of N motion vector by selecting the M motion vector in order of occurrence frequency for each group based on the count information. Here, N may be M*P.

According to the exemplary embodiment of the present invention, when the unit having a P kind of size is present within the reference picture, the encoder may sort the motion information within the reference picture into P groups based on the size of the unit. In this case, the encoder may obtain the count information by counting the occurrence frequency of the motion vector for each group during the encoding process. That is, the encoder may obtain the count information of the motion vector for each size of the unit. The encoder may extract a total of N motion vector by selecting the M motion vector in order of occurrence frequency for each group based on the count information. Here, N may be M*P.

According to another exemplary embodiment of the present invention, when a P kind of partition type is present within the reference picture, the encoder may sort the motion information within the reference picture into P groups based on the partition type. In this case, the encoder may obtain the count information by counting the occurrence frequency of the motion vector for each group during the encoding process. That is, the encoder may obtain the count information of the motion vector for each partition type. The encoder may extract a total of N motion vector by selecting the M motion vector in order of occurrence frequency for each group based on the count information. Here, N may be N*P. Here, the partition of the unit means the basic unit used for the inter prediction and the motion compensation and may have the size of L*K (L and K are a positive integer).

According to another exemplary embodiment of the present invention of the method for extracting motion information, the encoder may divide the reference picture into the plurality of regions. Here, each of the plurality of regions may be a region divided into a slice and the plurality of regions may have different motion vector generation distribution. In this case, the encoder may extract a total of N temporal motion information by extracting M (hereinafter, M is a positive integer) motion information according to the occurrence frequency for each region.

Figure 5:
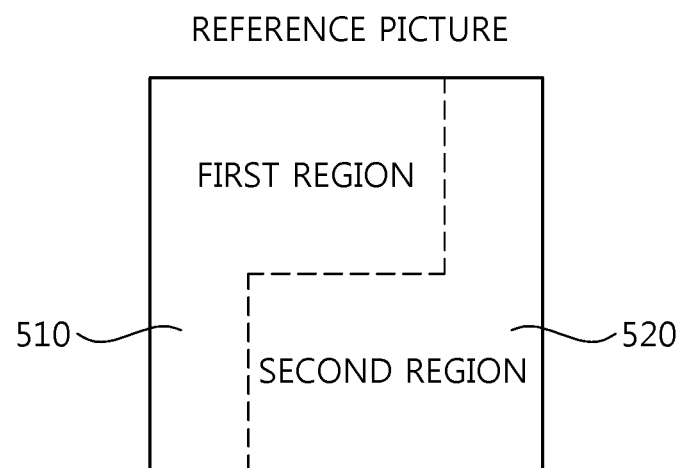
FIG. 5 is a diagram showing an exemplary embodiment of a reference picture dividing method.

FIG. 5 is a diagram showing an exemplary embodiment of a reference picture dividing method. Referring to FIG. 5, the reference picture may be divided into a first region 510 and a second region 520. The following Table 3 shows the exemplary embodiment of the method for extracting motion information according to the motion information occurrence frequency when the reference picture is divided into the first region 510 and the second region 520.

TABLE 3

| First region | | | Second region | | |
|---|---|---|---|---|---|
| Order of occurrence frequency | Motion vector | Count | Order of occurrence frequency | Motion vector | Count |
| 1 | [0, 0] | 2839 | 1 | [1, 0] | 4320 |
| 2 | [1, 0] | 569 | 2 | [0, −1] | 224 |
| 3 | [0, −1] | 432 | 3 | [0, 0] | 167 |
| 4 | [2, 0] | 258 | 4 | [1, 1] | 56 |
| 5 | [1, 1] | 129 | 5 | [2, 0] | 41 |
| 6 | [1, −1] | 54 | 6 | [1, −1] | 29 |
| ... | ... | ... | ... | ... | ... |

Referring to Table 3, the encoder may count the motion vector occurrence frequency for each region during the encoding process to obtain the count information. That is, the encoder may count the motion vector occurrence frequency for each of the first region 510 and the second region 520 to obtain the count information. In this case, the encoder may extract a total of N motion vector by selecting the M motion vector in order of occurrence frequency for each group based on the count information. For example, when the reference picture is divided into two regions and M is 3, the number of extracted motion vectors may be 6 in total.

According to another exemplary embodiment of the present invention of the method for extracting motion information, when the plurality of reference pictures for the encoding target unit and/or the current picture are used, the encoder may extract the M motion information for each of the reference pictures according to the occurrence frequency to extract a total of N temporal motion information.

Figure 6:
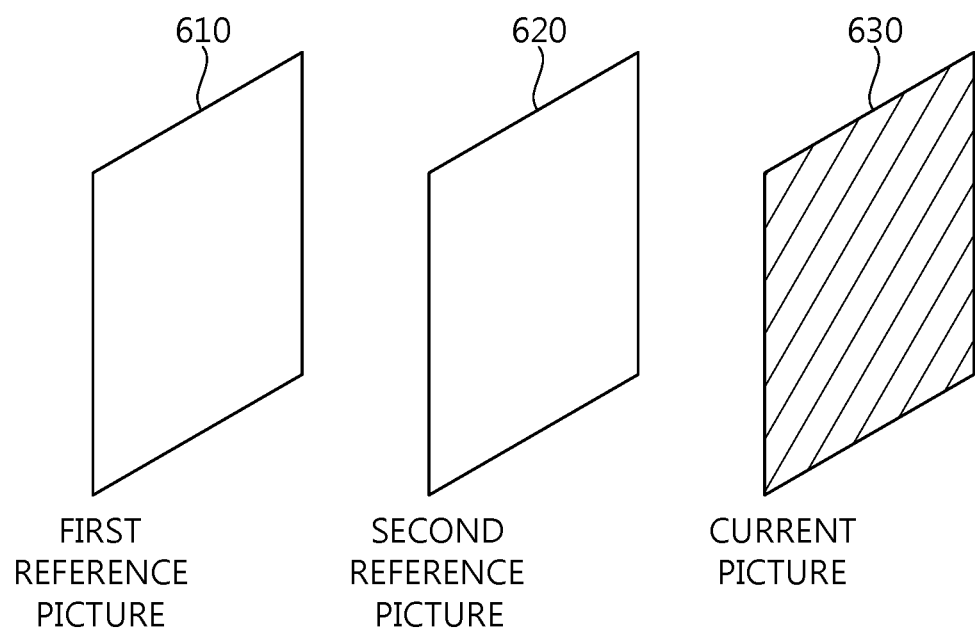
FIG. 6 is a diagram showing an exemplary embodiment of a reference picture used for inter prediction and/or the motion compensation for an encoding target unit.

FIG. 6 is a diagram showing an exemplary embodiment of a reference picture used for inter prediction and/or motion compensation for the encoding target unit. Referring to FIG. 6, the current picture 630 may include the encoding target unit. In this case, the first reference picture 610 and the second reference picture 620 may be used for the inter prediction of the encoding target unit. The following Table 4 shows the exemplary embodiment of the method for extracting motion information according to the motion information occurrence frequency when the plurality of reference pictures are used.

TABLE 4

| First reference picture | | | Second reference picture | | |
|---|---|---|---|---|---|
| Order of occurrence frequency | Motion vector | Count | Order of occurrence frequency | Motion vector | Count |
| 1 | [0, 0] | 2839 | 1 | [1, 0] | 4320 |
| 2 | [1, 0] | 569 | 2 | [0, −1] | 224 |
| 3 | [0, −1] | 432 | 3 | [0, 0] | 167 |
| 4 | [2, 0] | 258 | 4 | [1, 1] | 56 |
| 5 | [1, 1] | 129 | 5 | [2, 0] | 41 |
| 6 | [1, −1] | 54 | 6 | [1, −1] | 29 |
| ... | ... | ... | ... | ... | ... |

Referring to Table 4, the encoder may count the motion vector occurrence frequency for each reference picture during the encoding process to obtain the count information. That is, the encoder may count the motion vector occurrence frequency for each of the first reference picture 610 and the second reference picture 620 to obtain the count information. In this case, the encoder may extract a total of N motion vector by selecting the M motion vector in order of occurrence frequency for each reference picture based on the count information. For example, when two reference pictures are used and M is 3, the number of extracted motion vectors may be 6 in total.

According to another exemplary embodiment of the present invention of the method for extracting motion information, when the plurality of reference pictures for the encoding target unit and/or the current picture are used, the encoder may also extract the M motion information for each of the reference pictures and scale the selected motion information to extract a total of N temporal motion information.

In this case, for example, the encoder may calculate a temporal distance from the current picture for each reference picture and perform the scaling by using the calculated temporal distance. Here, the temporal distance may be a distance determined based on a display order when the current picture and the plurality of reference pictures are arrange in the display order.

For example, the encoder may count the motion vector occurrence frequency for each reference picture during the encoding process to obtain the count information. That is, the encoder may count the motion vector occurrence frequency for each reference picture to obtain the count information. In this case, the encoder may select a total of N motion vector by selecting the M motion vector in order of occurrence frequency for each reference picture based on the count information.

The encoder may calculate the temporal distance from the current picture for each of the reference pictures. The encoder may perform the scaling on the selected motion vector by using the calculated temporal distance and may extract the scaled motion vector as the temporal motion vector for the current picture and/or the current encoding unit. In this case, when the plurality of motion vectors are equal to one another among the scaled motion vectors, the encoder may extract only the single motion vector as the temporal motion vector among the motion vectors equal to one another.

For example, it is assumed that the two reference pictures are used and each of the reference pictures is the first reference picture and the second reference picture. In addition, it is assumed that the first temporal distance between the current picture and the first reference picture is 2 and the second temporal distance between the current picture and the second reference picture is 4.

When the motion vector selected from the first reference picture is [0, 2] and [1, 1] and the motion vector selected from the second reference picture is [0, 4] and [2, 4], the selected motion vector may be [0, 2], [1, 1], [0, 4], and [2, 4]. In this case, the encoder may scale the motion vectors selected from the first reference picture and/or the motion vector selected from the second reference picture based on the first temporal distance and the second temporal distance. For example, when the motion vectors [0, 4] and [2, 4] selected from the second reference picture are scaled, the scaled motion vector may be [0, 2] and [1, 2]. In this case, [0, 2] among the scaled motion vectors is equal to the motion vector selected from the first reference picture and therefore, the temporal motion vector finally extracted may be configured as {[0, 2], [1, 1], and [1, 2]}.

Meanwhile, the decoder may extract the motion information on the reference picture by using the same method as the method for extracting motion information used in the encoder. In this case, the encoder may not transmit the extracted motion information to the decoder. On the other hand, the process of extracting motion information as described above may also be performed only in the encoder rather than in the decoder. In this case, the encoder may decode the extracted motion information and may transmit the decoded motion information to the decoder.

Referring again to FIG. 4, the encoder may perform the inter prediction and/or the motion compensation for the encoding target unit within the current picture by using the extracted temporal motion information (S420).

For example, the encoder may use the extracted temporal motion information upon performing the motion vector prediction (MVP) and/or the advanced motion vector prediction (AMVP) on the encoding target unit. In this case, the encoder may use the temporal motion vector extracted from the reference picture as one of the motion vector candidates. When the motion vector prediction and/or the AMVP is applied, the encoder may perform the inter prediction and/or the motion compensation by using a block matching algorithm, a skip mode, a direction mode, or the like.

The block matching algorithm may mean an algorithm that determines the reference unit for the encoding target unit among the reconstructed units within the reference picture. The encoder may determine the reference unit for the encoding target unit among the reconstructed units within the reference picture by using the motion vector of the encoding target unit. In this case, the encoder may perform the inter prediction and/or the motion compensation for the encoding target unit by using the determined reference unit.

In the skip mode and the direct mode, the motion vector and the temporal motion vector of the reconstructed neighbor unit may be used as the motion vector of the encoding target unit and the reference picture index of the reconstructed neighbor unit may be used as the reference picture index of the encoding target unit. In the direct mode, the residual signal for the current encoding target unit may be encoded and then, may be transmitted to the decoder. However, in the skip mode, the residual signal may not be present and therefore, the encoder may not encode the residual signal.

Another exemplary embodiment of the present invention, the encoder may also perform the inter prediction and/or the motion compensation by using the merge mode. In the merge mode, the encoder may perform the inter prediction and/or the motion compensation by using at least one of the motion vector and the temporal motion vector of the reconstructed neighbor unit as the motion vector of the encoding target unit. In this case, the encoder may use the extracted temporal motion vector so as to derive the motion vector of the encoding target unit. For example, the encoder may use the extracted temporal motion vector as one of the merge candidates included in a merge candidate list. That is, the encoder may generate the merge candidate list by using the extracted temporal motion vector.

In this case, the encoder may decode the merge index and then, may transmit the encoded merge index to the decoder. Here, the merge index may be index indicating whether any of the merge candidates included in the merge candidate list is used for the inter prediction and the motion compensation of the encoding target unit. The decoder may receive and decode the merge index and may generate the merge candidate list by the same method as the encoder. In this case, the decoder may derive the motion information used for the inter prediction and the motion compensation of the decoding target unit by using the generated merge candidate list and the decoded merge index.

Further, the residual signal for the decoding target unit may not be present even in the merge mode. In this case, the encoder may not encode the residual signal. The encoding mode may be referred to as a merge skip mode.

Meanwhile, the temporal motion information extracted from the reference picture may be two or more. In this case, the encoder may select one of the plurality of extracted temporal motion information and may use the selected temporal motion information for the inter prediction and/or the motion compensation for the encoding target unit. In this case, the encoder may select the optimized temporal motion information by a rate-distortion optimization (RDO) method. Here, the rate-distortion optimization method may mean the method for selecting an optimized decoding method in terms of the rate and the distortion.

For example, the encoder may calculate rate-distortion cost when performing the encoding on each of the plurality of temporal motion vectors. In this case, the encoder may select one temporal motion vector having the minimum rate-distortion cost value. The encoder may use the selected temporal motion vector upon performing the inter prediction and/or the motion compensation. Further, the encoder may encode the motion vector index on the selected temporal motion vector and may transmit the encoded motion vector index included in the bit stream to the decoder.

The encoder may also use the temporal motion information extracted from the reference picture so as to encode the motion information of the encoding target unit. In this case, the temporal motion information extracted from the reference picture may be used as the predicted value on the motion information of the encoding target unit. Hereinafter, the predicted value for the motion information of the encoding target unit is referred to as the predicted motion information and the predicted value for the motion vector of the encoding target unit is referred to as the predicted motion vector.

For example, the encoder may use the temporal motion vector extracted from the reference picture as the predicted motion vector for the encoding target unit. The encoder may obtain the motion vector difference by the residuals between the motion vector and the predicted motion vector of the encoding target unit. In this case, the encoder may encode the obtained motion vector difference and may transmit the encoded motion vector difference included in the bit stream to the decoder. The following Equation 1 represents the exemplary embodiment of a method for calculating motion vector difference.

$$\text{motion\_vector\_difference} = \text{motion\_vector} - \text{extracted\_motion\_vector} \quad \text{[Equation 11]}$$

Here, the motion_vector_difference may represent the motion vector difference. In addition, the motion_vector may represent the motion vector of the encoding target unit and the extracted_motion_vector may represent the temporal motion vector extracted from the reference picture.

Referring again to FIG. 4, the encoder may encode the motion information extracted from the reference picture and/or the information related to the motion information (S430). The encoded information included in a sequence parameter set (SPS), a picture parameter set (PPS), or a slice header for the encoding target unit may be transmitted to the decoder.

According to the exemplary embodiment of the present invention, the encoder may encode a motion information encoding indicator that indicates whether the motion information extracted from the reference picture is encoded and is transmitted to the decoder. In this case, the motion information encoding indicator may also indicate whether the extracted motion information is used for the inter prediction and the motion compensation. The encoded motion information encoding indicator included in the bit stream may be transmitted to the decoder.

For example, the motion information encoding indicator may be represented by a syntax element referred to as coded_motion_vector_present_flag. The syntax element may be encoded in the picture parameter set or the slice header.

When the value of the coded_motion_vector_present_flag is 1, the encoder may encode the extracted temporal motion information and may transmit the encoded temporal motion information to the decoder. In this case, the decoder may decode the transmitted temporal motion information. The decoder may perform the inter prediction and the motion compensation for the decoding target unit by using the decoded temporal motion information. When the value of the coded_motion_vector_present_flag is 0, the encoder may not encode the extracted temporal motion information. In this case, the decoder may not use the extracted temporal motion information upon performing the inter prediction and the motion compensation.

In addition, the encoder may encode the motion information value extracted from the reference picture. The encoded motion information value included in the bit stream may be transmitted to the decoder.

When the plurality of motion vectors are extracted from the reference picture, the encoder may encode the extracted motion vector value by using difference pulse code modulation (DPCM). In this case, the encoder may perform the prediction for each motion vector by using the DPCM.

For example, it is assumed that the two motion vectors are extracted from the reference picture. The extracted motion vector is referred to as a first motion vector and a second motion vector, respectively. Here, the first motion vector may be represented by extracted_motion_vector_1 and the second motion vector may be represented by extracted_motion_vector_2. When the DPCM is used, the first motion vector value may be used as the predicted value for the second motion vector value. In this case, the encoder may obtain the motion vector difference for the second motion vector by using the predicted value (first motion vector value) at the time of encoding the second motion vector value. This may be represented by, for example, the following Equation 2.

motion_vector_difference_2=extracted_motion_vector_2−extracted_motion_vector_1  [Equation 2]

Here, the motion_vector_difference_2 may represent the motion vector difference for the second motion vector. When the motion vector difference is derived by the aforementioned method, the encoder may encode the derived motion vector difference value and may transmit the encoded motion vector difference value to the decoder.

When the motion information extracted from the reference picture is 1, the encoder may encode the extracted motion information value without performing the prediction on the extracted motion information. In this case, the encoded motion information value included in the bit stream may be transmitted to the decoder.

Meanwhile, as described above, the number of motion information extracted from the reference picture may be two or more. When the number of extracted motion information is 2 or more, the encoder may select one of the plurality of extracted motion information and may use the selected motion information for the inter prediction and/or motion compensation for the encoding target unit. In this case, the encoder may encode the motion information index indicating whether any of the plurality of extracted motion information is used. The encoded motion information index included in the bit stream may be transmitted to the decoder.

The following Table 5 shows the exemplary embodiment of the extracted motion vector when the number of motion vector extracted from the reference picture is 2 or more.

TABLE 5

| Motion vector | Index |
|---|---|
| [0, 0] | 0 |
| [1, 0] | 1 |
| [0, −1] | 2 |
| [2, 0] | 3 |
| . . . | . . . |

Referring to Table 5, each motion vector may be allocated with the motion information index. For example, when [0, −1] of the plurality of extracted motion vectors is used, the encoder may encode the motion information index value 2 and may transmit the encoded motion information index value to the decoder. In this case, the decoder may derive the motion vector used for the inter prediction and the motion compensation by using the transmitted motion information index.

When the motion information extracted from the reference picture is 1, the encoder may not encode the motion information index.

As described below, the decoder may extract the N (N is a positive integer) temporal motion information by the same method as the encoder. The extracted temporal motion information may be used for the inter prediction and the motion compensation for the decoding target unit. In this case, the encoder may not encode the temporal motion information value and/or the motion information index extracted from the reference picture.

According to the aforementioned inter prediction method, the encoder may efficiently encode the temporal motion information at the time of encoding the image. In addition, the encoder may not store the motion information within the reference picture in the memory and therefore, may reduce the memory requirement and memory bandwidth and improve the error resiliency at the time of the inter prediction and the motion compensation for the encoding target unit. Therefore, the entire image encoding efficiency can be improved.

Figure 7:
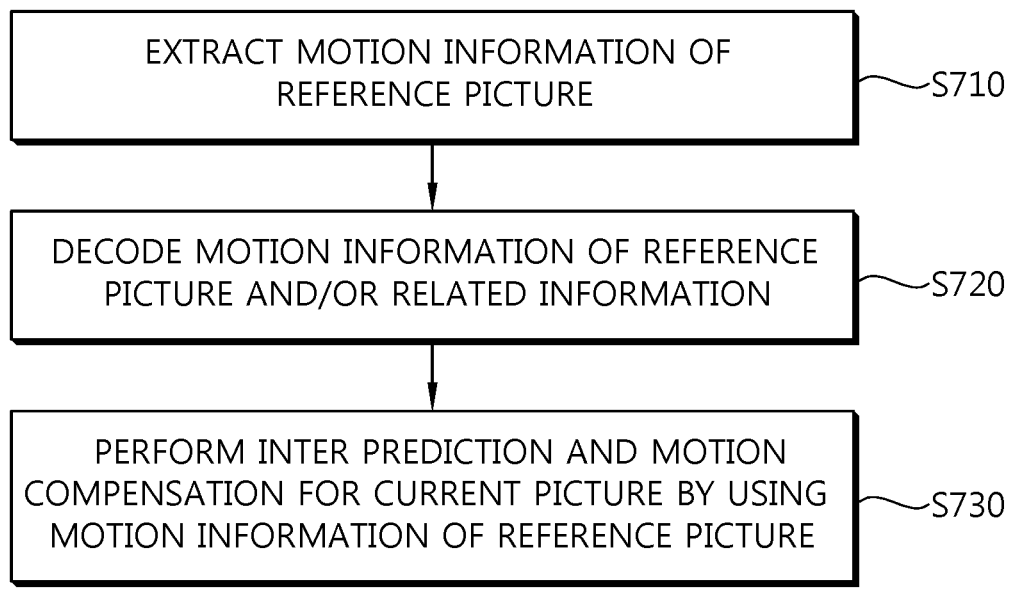
FIG. 7 is a flow chart schematically showing an inter prediction method in a decoder according to an exemplary embodiment of the present invention.

FIG. 7 is a flow chart schematically showing an inter prediction method in a decoder according to an exemplary embodiment of the present invention.

Referring to FIG. 7, the decoder may extract the motion information on the reference picture for the current picture (S710).

The decoder may extract N motion information among the motion information included in the reference picture. The extracted motion information may be used for the inter prediction and/or the motion compensation of the decoding target unit within the current picture. Here, N indicates a positive integer and in the exemplary embodiments as described below, N means the positive integer.

The decoder may extract the motion information on the reference picture by using the same method as the method for extracting motion information used in the encoder. In this case, the decoder may extract the same motion information as the temporal motion information extracted from the encoder. The exemplary embodiments of the method for extracting motion information are described in FIG. 4 and therefore, the detailed description thereof will be omitted.

Meanwhile, as described above, the encoder may encode the motion information value extracted from the reference picture and may transmit the encoded motion information value included in the bit stream to the decoder. In this case, the decoder may derive the motion information of the reference picture from the transmitted bit stream and therefore, the decoder may not perform the process of extracting motion information.

Referring again to FIG. 7, the decoder may decode the motion information on the reference picture transmitted from the encoder and/or the information related to the motion information (S720). The decoder may decode the information in a sequence parameter set (SPS), a picture parameter set (PPS), or a slice header.

According to the exemplary embodiment of the present invention, the decoder may decode a motion information encoding indicator that indicates whether the temporal motion information extracted from the encoder is encoded and is transmitted to the decoder. In this case, the motion information encoding indicator may also indicate whether the temporal motion information extracted from the encoder is used for the inter prediction and the motion compensation.

For example, the motion information encoding indicator may be represented by a syntax element referred to as coded_motion_vector_present_flag. The syntax element may be decoded in the picture parameter set or the slice header.

When the value of the coded_motion_vector_present_flag is 1, the encoder may encode the temporal motion information extracted from the reference picture and may transmit the encoded temporal motion information to the decoder. In this case, the decoder may decode the transmitted temporal motion information. The decoder may perform the inter prediction and the motion compensation for the decoding target unit by using the decoded temporal motion information. When the value of the coded_motion_vector_present_flag is 0, the encoder may not encode the temporal motion information extracted from the reference picture. In this case, the decoder may not decode the extracted temporal motion information and may not use the extracted temporal motion information upon performing the inter prediction and the motion compensation.

In addition, as described above, the encoder may encode the motion information value extracted from the reference picture and may transmit the encoded motion information value to the decoder. In this case, the decoder may receive and decode the transmitted motion information value.

When the plurality of motion vectors are extracted from the reference picture, the encoder predicts the extracted motion vector value by using the DPCM and then, may encode the difference between the predicted motion vector value and the extracted motion vector value, that is, the motion vector difference. The encoded motion vector difference may be transmitted to the decoder and the decoder may derive the temporal motion information by using the transmitted motion vector difference.

For example, it is assumed that the two motion vectors are encoded in the encoder. The encoded motion vector is referred to as a first motion vector and a second motion vector, respectively. Here, the first motion vector may be represented by extracted_motion_vector_1 and the second motion vector may be represented by extracted_motion_vector_2. When the DPCM is used, the first motion vector value may be used as the predicted value for the second motion vector value. In this case, as described above, the encoder may transmit the motion vector difference for the second motion vector to the decoder. Here, the motion vector difference for the second motion vector may be represented by the motion_vector_difference_2.

The decoder may decode the first motion vector value. In addition, the decoder decodes the motion vector difference for the second motion vector and the may derive the second motion vector value by adding the decoded motion vector difference to the first motion vector value. This may be represented by, for example, the following Equation 3.

$$\text{extracted\_motion\_vector\_2} = \text{motion\_vector\_difference\_2} + \text{extracted\_motion\_vector\_1} \quad [\text{Equation 3}]$$

When the motion information extracted from the reference picture is 1, the encoder may encode the extracted motion information value without performing the prediction on the extracted motion information and may transmit the encoded motion information value to the decoder. In this case, the decoder may decode the transmitted motion information value without performing the prediction for the motion information.

Meanwhile, the number of motion information extracted from the reference picture may be two or more. The motion information may be extracted from the encoder and may be transmitted to the decoder and may be extracted from the decoder. In this case, the decoder may select one of the plurality of motion information and may use the selected motion information for the inter prediction and/or the motion compensation for the decoding target unit.

As described above, when the number of motion information extracted from the reference picture is 2, the encoder may encode the motion information index and may transmit the encoded motion information index to the decoder. Here, the motion information index is an index indicating whether any of the plurality of extracted motion information is used. In this case, the decoder may decode the received motion information index. The decoder may have the plurality of motion information that is the same as the motion information extracted from the encoder and therefore, may select the motion information used for the inter prediction and the motion compensation by using the decoded motion information index.

The following Table 6 shows the exemplary embodiment of the extracted motion vector when the number of motion vector extracted from the reference picture is 2 or more.

TABLE 6

| Motion vector | Index |
|---|---|
| [0, 0] | 0 |
| [1, 0] | 1 |
| [0, −1] | 2 |
| [2, 0] | 3 |
| . . . | . . . |

Referring to Table 6, each motion vector may be allocated with the motion information index. For example, when the motion information index value transmitted from the encoder is 2, the decoder may use the motion vector [0, −1], to which the index value of 2 is allocated, for the inter prediction and the motion compensation.

When the motion information extracted from the reference picture is 1, the encoder may not encode the motion information index. In this case, the encoder may not transmit the motion information index and therefore, the decoder may not decode the motion information index.

As described above, the decoder may extract the N (N is a positive integer) temporal motion information by the same method as the encoder. The extracted temporal motion information may be used for the inter prediction and the motion compensation for the decoding target unit. In this case, the encoder may not encode the temporal motion information value and/or the motion information index extracted from the reference picture. In this case, the decoder may not decode the motion information value, the motion information index, or the like. That is, the process of decoding the above-mentioned motion information value and motion information index, or the like, may be omitted.

The decoder may derive the temporal motion information of the reference picture by the process of extracting motion information (S710) and/or the process of decoding motion information (S720). The motion information of the reference picture derived from the decoder may be the same as the temporal motion information extracted from the encoder. Hereinafter, the motion information of the reference picture derived from the decoder is referred to as the reference motion information and the motion vector of the reference picture derived from the decoder is refereed to as the reference motion vector.

Referring again to FIG. 7, the decoder may perform the inter prediction and/or motion compensation for the decoding target unit within the current picture by using the reference motion information derived by the aforementioned method (S730).

For example, the decoder may use the reference motion information upon performing the motion vector prediction (MVP) and/or the advanced motion vector prediction (AMVP) on the decoding target unit. In this case, the decoder may use the reference motion vector as one of the motion vector candidates. When the motion vector prediction and/or the AMVP are applied, the decoder may perform the inter prediction and/or the motion compensation by using the reference motion vector.

In the skip mode and the direct mode, the motion vector and the temporal motion vector of the reconstructed neighbor unit may be used as the motion vector of the decoding target unit and the reference picture index of the reconstructed neighbor unit may be used as the reference picture index of the decoding target unit. In the direct mode, the residual signal for the current decoding target unit may be decoded. However, in the skip mode, the residual signal may not be present and therefore, the decoder may not decode the residual signal.

Another exemplary embodiment of the present invention, the decoder may also perform the inter prediction and/or the motion compensation by using the merge mode. In the merge mode, the decoder may perform the inter prediction and/or the motion compensation by using at least one of the motion vector and the temporal motion vector of the reconstructed neighbor unit as the motion vector of the decoding target unit. In this case, the decoder may use the reference motion vector so as to derive the motion vector of the decoding target unit. For example, the decoder may use the reference motion vector as one of the merge candidates included in the merge candidate list.

Further, the residual signal for the decoding target unit may not be present even in the merge mode. In this case, the decoder may not decode the residual signal. The decoding mode may be referred to as the merge skip mode.

Meanwhile, the reference motion information derived from the decoder may be two or more. In this case, the decoder may select one of the plurality of derived reference motion information and may use the selected reference motion information for the inter prediction and/or the motion compensation for the encoding target unit. In this case, for example, the decoder may decode the motion information index transmitted from the encoder and may select the reference motion information used for the inter prediction and the motion compensation by using the decoded motion information index. Here, the motion information index may indicate whether any of the plurality of derived reference motion information is used.

The decoder may use the reference motion information so as to derive the motion information of the decoding target unit. In this case, the reference motion information may be used as the prediction value on the motion information of the encoding target unit.

For example, the decoder may use the reference motion vector as the predicted motion vector for the decoding target unit. Here, the predicted motion vector may mean the predicted value for the motion vector of the decoding target unit. As described above, the encoder may derive the motion vector difference between the motion vector of the encoding target unit and the motion vector extracted from the reference picture and may transmit the derived motion vector difference to the decoder. In this case, the decoder may receive and decode the motion vector difference and may derive the motion vector of the decoding target unit by adding the decoded motion vector difference to the reference motion vector. This may be, for example, represented by the following Equation 4.

$$\text{motion\_vector} = \text{motion\_vector\_difference} + \text{extracted\_motion\_vector} \quad \text{[Equation 4]}$$

Here, the motion_vector may represent the motion vector of the decoding target unit. In addition, the motion_vector_difference may represent the motion vector difference and the extracted_motion_vector may represent the reference motion vector.

According to the aforementioned inter prediction method, the decoder may efficiently decode the temporal motion information at the time of decoding the image. In addition, the decoder may not store the motion information within the reference picture in the memory and therefore, may reduce the memory requirement and memory bandwidth and improve the error resiliency at the time of the inter prediction and the motion compensation for the decoding target unit. Therefore, the entire image decoding efficiency can be improved.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

The invention claimed is:

1. A video decoding method, comprising:
   deriving spatial motion information from a neighboring unit of a decoding target unit;
   obtaining index information relating to temporal motion information of the decoding target unit from a bitstream, wherein the index information specifies a first reference picture having the temporal motion information of the target unit among a plurality of reference pictures in a reference picture list, and wherein the neighboring unit is adjacent to the decoding target unit or is disposed at a corner of the decoding target unit;

selecting, based on the index information, the first reference picture among the plurality of the reference pictures in the reference picture list;

deriving the temporal motion information from a collocated unit of the selected first reference picture, the first reference picture having a different temporal order from a picture including the decoding target unit, wherein the temporal motion information includes a motion vector of the collocated unit;

generating a merge candidate list for the decoding target unit including derived spatial motion information and the derived temporal motion information; and performing motion compensation on the decoding target unit by using the merge candidate list, wherein the step of performing the motion compensation comprises:

obtaining a merge index of the decoding target unit;

selecting motion information indicated by the merge index among merge candidates included in the merge candidate list; and performing the motion compensation for the decoding target unit using the selected motion information.

2. A video encoding method, comprising:

deriving spatial motion information from a neighboring unit of an encoding target unit, wherein the neighboring unit is adjacent to the encoding target unit or is disposed at a corner of the encoding target unit;

deriving temporal motion information from a collocated unit of a first reference picture, the first reference picture having a different temporal order from a picture including the encoding target unit, wherein the temporal motion information includes a motion vector of the collocated unit;

generating a merge candidate list for the encoding target unit including the derived spatial motion information and the derived temporal motion information;

encoding, based on the merge candidate list, a merge index of the encoding target unit; and encoding index information relating to the temporal motion information of the encoding target unit, wherein the index information specifies the first reference picture having the temporal motion information of the encoding target unit among a plurality of reference pictures in a reference picture list.

3. A non-transitory computer-readable recording-medium storing a bitstream which is generated by a video encoding method, the method comprising:

deriving spatial motion information from a neighboring unit of an encoding target unit, wherein the neighboring unit is adjacent to the encoding target unit or is disposed at a corner of the encoding target unit;

deriving temporal motion information from a collocated unit of a first reference picture, the first reference picture having a different temporal order from a picture including the encoding target unit, wherein the temporal motion information includes a motion vector of the collocated unit;

generating a merge candidate list for the encoding target unit including the derived spatial motion information and the derived temporal motion information;

encoding, based on the merge candidate list, a merge index of the encoding target unit; and encoding index information relating to the temporal motion information of the encoding target unit, wherein the index information specifies the first reference picture having the temporal motion information of the encoding target unit among a plurality of reference pictures in a reference picture list.

* * * * *